June 6, 1972   J. W. SHERRICK   3,667,820

RAILWAY CAR HAVING RESILIENT CENTER BEARING

Filed Dec. 11, 1970

INVENTOR
JAMES W. SHERRICK

BY *James W. Wright*

ATTORNEY

United States Patent Office 3,667,820
Patented June 6, 1972

3,667,820
RAILWAY CAR HAVING RESILIENT
CENTER BEARING
James W. Sherrick, Edinboro, Pa., assignor to
Lord Corporation, Erie, Pa.
Filed Dec. 11, 1970, Ser. No. 97,217
Int. Cl. F16o 17/10; B61f 5/16
U.S. Cl. 308—137
5 Claims

ABSTRACT OF THE DISCLOSURE

In a railway car having truck and car body center plates disposed in telescoping relation, preferably defining nested conical opposed load carrying surfaces, a unitary resilient bearing in the form of an elastomeric body is disposed between the load carrying surfaces and cooperates therewith to carry both vertical and horizontal loads between the load carrying surfaces predominately in compression while carrying torsional or turning loads predominately in shear. The compressive stiffness of the elastomeric body is substantially increased by the addition of a relatively nonextensible conical annular plate embedded in and bonded to the elastomeric body intermediate the load carrying surfaces without substantially affecting the shear stiffness of the body in accommodating relative angular movement between the center plates.

This invention relates to a railway car having a resilient center bearing and more particularly to an arrangement wherein both vertical and horizontal loads between the car body and truck are taken predominately by compression in the resilient bearing while torsional or turning loads are taken predominately by shear in the resilient bearing.

In conventional railway cars, the car body center plate is received in telescoping relation with the truck center plate. The center plate connections are typically the only connections between the truck and car body and vertical, horizontal and torsional loads between the center plates are carried in metal-to-metal contact. In addition to the various loads that must be carried, relative angular movement between the car and truck center plates, such as when the railway car moves along a track around a curve, must be accommodated. Such relative annular movement may be as much as about 10° but is usually considerably less. As a result of this relative movement, considerable friction is developed resisting such relative movement and causing excessive wear and galling of the center plates. While lubrication is typically used in order to minimize the amount of friction involved, the large weight of the car body usually causes any lubrication between the center plates to extrude out from therebetween. Furthermore, due to the metal-to-metal contact between the center plates, vibrations and shocks are transmitted directly between the center plates. Thus, it will be apparent that the riding qualities of the railway car are less than satisfactory, excessive wear takes place, particularly between the center plates, lubrication is frequently required, and there are no inherent or internal forces tending to return the center plates to predetermined relationship with each other to align the truck and car body subsequent to any relative annular movement.

There have been various attempts to provide in a railway car, a resilient center bearing which will eliminate the problems associated with the conventional arrangement described above. For instance, reference is made to Thomas, U.S. Pat. No. 3,257,969 entitled, "Railway Car Center Plate," issued June 28, 1966 and assigned to the assignee of the present invention. In the arrangement there illustrated, the truck center plate has an upstanding annular shoulder surrounding an upwardly presented horizontal load carrying surface and the car body center plate has a depending annular shoulder surrounding a downwardly presented horizontal load carrying surface with the shoulders being disposed in telescoping relation. An annular planar elastomer-metal sandwich is disposed between the load carrying surfaces of the center plates and is substantially solely loaded in compression by vertical loads such as the weight of the car body while relative angular motion between the center plates is accommodated in torsional shear of the sandwich. Horizontal loads cause a limited amount of relative horizontal movement between the center plates which is abruptly stopped by metal-to-metal contact of the telescoped annular shoulders. The present invention is an improvement over that described in the above mentioned patent in that both horizontal and vertical loads are carried predominately, that is, fifty percent or more, by compression of the resilient bearing to provide numerous advantages. For instance, any metal-to-metal contact in the horizontal direction is eliminated while providing substantial cushioned resistance to any relative horizontal movement between the center plates.

Accordingly, it is an object of the present invention to provide in a railway car, a resilient bearing disposed between the load carrying surfaces of the truck and car body center plates which carries both vertical and horizontal loads therebetween predominately in compressible while carrying torsional loads predominately in shear to readily accommodate relative angular movement between truck and car body.

Briefly, the objects of the present invention are accomplished by providing in a railway car, truck and car body center plate means disposed in telescoping relation and having opposed, preferably nested conical, load carrying surfaces spaced from and presented toward each other. A unitary resilient bearing means preferably comprising a frustoconical annular body of elastomer having an included angle equivalent to that of the load carrying surfaces is disposed between the load carrying surfaces with opposite sides thereof nonrotatably secured to the load carrying surfaces. At least one relatively nonextensible conical annular plate is preferably embedded in and bonded to the body of elastomer intermediate the load carrying surfaces for increasing the compressive stiffness or effective compressive spring rate of the body of elastomer while not substantially affecting the shear stiffness or effective shear spring rate of the body so that relative angular movement between the center plate means is readily accommodated. The load carrying surfaces are inclined relative to horizontal and the effective compressive and share spring rates are such that both vertical and horizontal loads predominately load the elastomeric body in compression while torsional or turning loads predominately load the elastomeric body in shear.

Some of the objects and advantages of the invention having been stated, others will appear as the description proceeds, when taken in connection with the accompanying drawings, in which.

Referring more specifically to the drawings wherein like reference characters are employed where possible to indicate like parts, there is shown in FIG. 1 portions of a railway car, generally designated at 10, illustrating the present invention.

Figure 1:
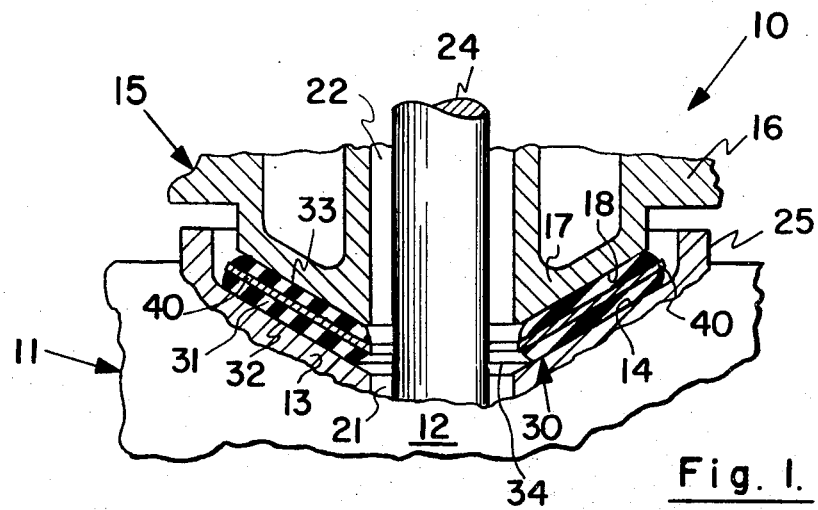
FIG. 1 is a fragmentary elevational view with parts in section illustrating the present invention.

As illustrated, a railway truck, generally indicated at 11, includes a truck bolster 12 having a center plate 13 defining an upwardly presented conical load carrying surface 14. A car body, generally indicated at 15, includes a car bolster 16 having a center plate 17 defining a downwardly presented conical load carrying surface 18, the included angle of which is equivalent to that of the truck center plate 13. Both the center plates 13 and 17 are annular and are received in telescoping relation with the apertures 21 and 22 vertically aligned and receiving therethrough the conventional center pin 24. With the center plates 13 and 17 disposed in telescoping relation, the conical load carrying surfaces 14 and 18 are nested together to be in opposed and presented toward each other. A cylindrical flange 25 may be provided on one of the center plates, such as the truck center plate 13, which surrounds the car body center plate 17 and serves as a positive stop such as in the event that the resilient bearing to be hereinafter described fails during operation of the railway car 10. The center plates 13 and 17 are normally metal castings which may, if desirable, be formed integrally with the truck and car bolsters 12 and 16 and in accordance with the present invention may be used in the as cast conditions.

Figure 2:
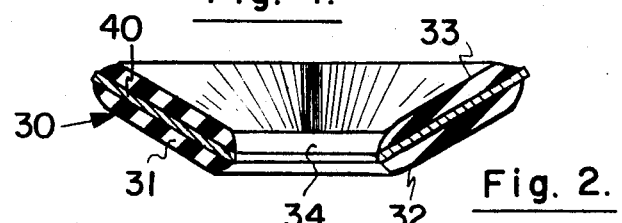
FIG. 2 is a sectional view taken diametrically through the resilient bearing of FIG. 1.

In accordance with the present invention, a unitary resilient bearing, generally indicated at 30, is disposed between the load carrying surfaces 14 and 18 of the center plates 13 and 17 for carrying both vertical and horizontal loads therebetween predominately in compression while carrying torsional or turning loads predominately in shear to accommodate relative angular motion between the center plates 13 and 17. As illustrated in FIGS. 1 and 2, the unitary resilient bearing means 30 generally comprises a frustoconical annular body 31 of elastomeric material such as natural or synthetic rubbers having an included angle equivalent to that of the load carrying surfaces 14 and 18. Opposite faces 32 and 33 of the elastomeric body 31 conform to and bear in frictional engaging relation against the load carrying surfaces 14 and 18, respectively. The aperture 34 in the body 31 is vertically aligned with the apertures 21 and 22 in the center plates 13 and 17 and, likewise, has received therethrough center pin 24.

The normal weight of the car body 15 is typically sufficient to prevent relative movement, angular or otherwise, between the frictionally engaging surfaces to, thus, nonrotatably secure the opposite faces 32 and 33 of the elastomeric body 31 to the load carrying surfaces 14 and 18. However, other means may be employed for preventing rotation of the opposite faces 32 and 33 of the elastomeric body 31 relative to the load carrying surfaces 14 and 18. That is, if the friction is inadequate, adhesives or other anchoring procedures may be used in place of or as a supplement to the friction. For instance, frustoconical annular plates may be bonded to opposite faces 32 and 33 and nonrotatably anchored to load carrying surfaces 14 and 18 by anchoring pins as illustrated in the above referenced Thomas patent. With the opposite faces 32 and 33 of the elastomeric body 31 conforming to the load carrying surfaces 14 and 18 there is insured a uniform load distribution between the center plates 13 and 17 and the elastomeric body 31.

The elastomeric body 31 preferably has at least one relatively nonextensible frustoconical annular plate 40 embedded in and bonded thereto intermediate load carrying surfaces 14 and 18 and opposite faces 32 and 33. The plate 40 resists the tendency of the elastomer to bulge at locations of load free area to increase the compressive stiffness or effective compressive spring rate without substantially affecting its shear stiffness or effective shear spring rate. In addition, the embedded plate 40 facilitates in anchoring the elastomeric body 31 so that it cannot creep or shift from between the center plates 13 and 17 during service. If it is desired to further increase the compressive stiffness or effective spring rate of the resilient bearing means 30, additional plates 40 may be similarly disposed throughout the elastomeric body 31 without substantially affecting the shear stiffness or effective shear spring rate thereof. Since the torsional shear loads are those caused by relative angular motion between the center plates 13 and 17, it is important that the resistance to shear be kept low so as to readily accommodate such relative movement which is typically associated with turning or movement of the railway car about curves.

Figure 3:
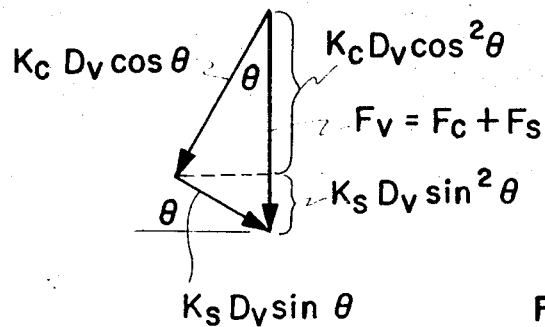
FIGS. 3 and 4 are force diagrams illustrating the breakdown of forces carried in compression and shear as a result of vertical and horizontal loads, respectively.
Figure 4:
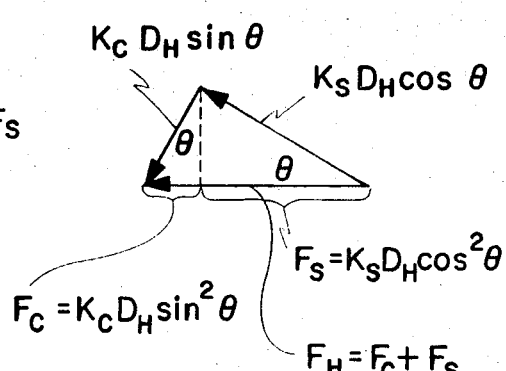

In order for the unitary resilient bearing means 30 to carry both vertical and horizontal loads predominately in compression, it is essential that the included angle formed by the conical load carrying surfaces 14 and 18 and elastomeric body 31 be properly designed. As heretofore indicated for purposes of this invention, predominate shall mean fifty percent or more. With reference to FIGS. 3 and 4, there is shown the breakdown of forces in the elastomeric body 31 as a result of vertical and horizontal loads $F_V$ and $F_H$, respectively. A vertical load $F_V$, FIG. 3, imposes a compressive force $K_C D_V \cos \theta$ and a shear force $K_S D_V \sin \theta$ on the elastomeric body 31 wherein:

$K_C$ = effective compressive spring rate of elastomeric body;
$K_S$ = effective shear spring rate of elastomeric body;
$D_V$ = vertical deflection resulting from vertical load $F_V$; and
$\theta$ = angle of inclination of the load carrying surfaces 14 and 18 and elastomeric body 31 relative to horizontal.

It then follows that the portion $F_C$ of the vertical load $F_V$ carried in compression is $K_C D_V \cos^2 \theta$ and the portion $F_S$ of the vertical load $F_V$ carried in shear is $K_S D_V \sin^2 \theta$. Thus, a vertical load $F_V$ is predominately carried in compression when:

$$K_C/K_S \geq \tan^2 \theta$$

A horizontal load $F_H$, FIG. 4, imposes a compressive force $K_C D_H \sin \theta$ and a shear force $K_S D_H \cos \theta$ on the elastomeric body 31 wherein:

$K_C$ = effective compressive spring rate of elastomeric body;
$K_S$ = effective shear spring rate of elastomeric body;
$D_H$ = horizontal deflection resulting from horizontal load $F_H$; and
$\theta$ = angle of inclination of the load carrying surfaces 14 and 18 and elastomeric body 31 relative to horizontal.

It then follows that the portion $F_C$ of the horizontal load $F_H$ carried in compression is $K_C D_H \sin^2 \theta$ and the portion $F_S$ of the horizontal load $F_H$ carried in shear is $$K_S D_H \cos^2 \theta$$

Thus, a horizontal load $F_H$ is predominately carried in compression when:

$$K_C/K_S \geq \cot^2 \theta$$

In accordance with the above, it will be seen that both vertical and horizontal loads are predominately carried in compression when:

$$K_C/K_S \geq \tan^2 \theta \text{ and } \cot^2 \theta$$

Figure 5:
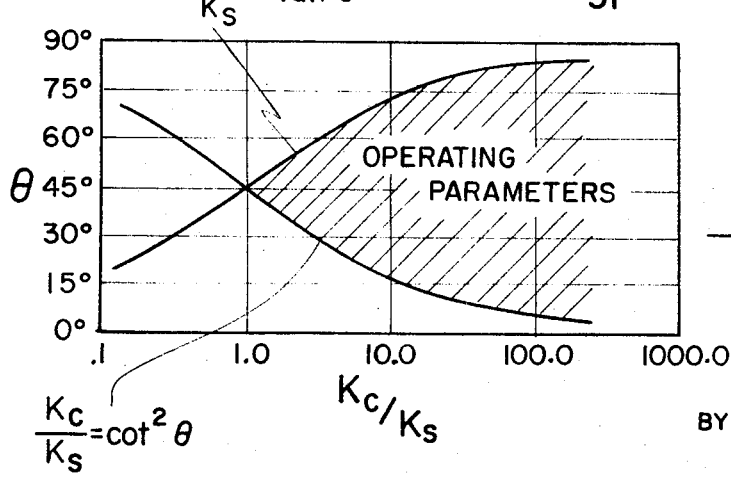
FIG. 5 is a graphic diagram illustrating the operative design parameters of the resilient bearing of the present invention.

With reference now to FIG. 5, there is graphically illustrated the operating parameters as defined above within which the load carrying surfaces 14 and 18 and resilient bearing 30 herein described should be designated in order for both vertical and horizontal loads to predominately load the resilient bearing 30 in compression.

In the drawing and specification, there has been set forth a preferred embodiment of the invention, and although specific terms are employed, they are used in a generic and descriptive sense only and not for purposes of limitation.

What is claimed is:

1. In a railway car, truck and car body center plate means disposed in telescoping relation and having opposed upwardly and downwardly facing load carrying surfaces spaced from and presented toward each other, and unitary resilient bearing means disposed between said load carrying surfaces and cooperating therewith to carry vertical and horizontal loads therebetween predominately in compression while carrying torsional loads predominately in shear.

2. In a railway car, truck and car body center plate means disposed in telescoping relation and defining nested upwardly and downwardly facing conical load carrying surfaces spaced from and presented toward each other, a unitary frustoconical annular elastomeric bearing means disposed between said load carrying surfaces with opposite sides thereof nonrotatably secured to said load carrying surfaces and having an included angle substantially equivalent to that of said load carrying surfaces, said included angle and effective compressive and shear spring rates of said elastomeric bearing being such that vertical and horizontal loads predominately load said elastomeric bearing means in compression while torsional or turning loads predominately load said elastomeric bearing means in shear.

3. In a railway car, truck and car body center plate means disposed in telescoping relation and defining nested upwardly and downwardly facing conical load carrying surfaces spaced from and presented toward each other and inclined at an angle, $\theta$, relative to horizontal, a unitary frustoconical annular elastomeric body disposed between said load carrying surfaces and having opposite sides thereof similarly inclined at the angle $\theta$ relative to horizontal and nonrotatably secured to said load carrying surfaces, the ratio of the effective compressive to shear spring rate, $K_C/K_S$, of said elastomeric body being such that $$K_C/K_S \geq \tan^2 \theta \text{ and } \cot^2 \theta$$

whereby both vertical and horizontal loads predominately load said elastomeric body in compression while torsional or turning loads predominately load said elastomeric body in shear.

4. In a railway car, as set forth in claim 3, including at least one relatively nonextensible frustoconical annular plate embedded in and bonded to said body intermediate said load carrying surfaces for increasing the effective compressive spring rate of said body while not substantially affecting the effective shear spring rate of said body.

5. In a railway car, as set for in claim 3, wherein opposed faces of said elastomeric body conform to and bear in frictionally engaging relation against said load carrying surfaces and including at least one relatively nonextensible frustoconical annular plate embedded in and bonded to said body intermediate said load carrying surfaces for increasing the effective compressive spring rate of said body while not substantially affecting the effective shear spring rate of said body.

References Cited

UNITED STATES PATENTS

| 3,257,969 | 6/1966 | Thomas | 308—136 X |
| 2,954,747 | 10/1960 | Hirst et al. | 105—199 F |
| 1,094,185 | 4/1914 | Adams | 308—136 |
| 2,259,049 | 10/1941 | Swan et al. | 105—199 F |
| 2,509,955 | 5/1950 | Barnes | 248—10 X |

FOREIGN PATENTS

| 936,173 | 12/1955 | Germany | 267—3 |
| 1,197,694 | 7/1965 | Germany | 248—358 |

MARTIN P. SCHWADRON, Primary Examiner

B. GROSSMAN, Assistant Examiner

U.S. Cl. X.R.

105—199 F